United States Patent [19]

Shin et al.

[11] Patent Number: 4,562,036

[45] Date of Patent: Dec. 31, 1985

[54] SHOCK WAVE ABSORBER HAVING APERTURED PLATE

[75] Inventors: Yong W. Shin, Western Springs; Arne H. Wiedermann, Chicago Heights, both of Ill.; Carl E. Ockert, Vienna, Va.

[73] Assignee: The United States of America as represented by the United States Department of Energy, Washington, D.C.

[21] Appl. No.: 526,765

[22] Filed: Aug. 26, 1983

[51] Int. Cl.⁴ .................................................. G21C 9/00
[52] U.S. Cl. ........................................ 376/283; 138/30
[58] Field of Search ........................ 376/283; 137/207; 138/30

[56] References Cited

U.S. PATENT DOCUMENTS

| | | | |
|---|---|---|---|
| 2,676,617 | 4/1954 | Felger | 138/30 |
| 2,845,951 | 8/1958 | Hugley et al. | 138/30 |
| 2,896,862 | 7/1959 | Bede | 137/207 |
| 3,082,784 | 3/1963 | McMath | 137/207 |
| 3,095,012 | 6/1963 | McShane | 138/30 |
| 3,148,745 | 9/1964 | Jones | 137/207 |
| 3,422,853 | 1/1969 | Schmid | 138/30 |
| 4,186,775 | 2/1980 | Muroi | 138/30 |

FOREIGN PATENT DOCUMENTS 0821760  4/1981  U.S.S.R. .............................. 137/207

*Primary Examiner*—Deborah L. Kyle
*Assistant Examiner*—Richard Wendtland
*Attorney, Agent, or Firm*—Charles F. Lind; Hugh W. Glenn; Judson R. Hightower

[57] ABSTRACT

The shock or energy absorber disclosed herein utilizes an apertured plate maintained under the normal level of liquid flowing in a piping system and disposed between the normal liquid flow path and a cavity pressurized with a compressible gas. The degree of openness (or porosity) of the plate is between 0.01 and 0.60. The energy level of a shock wave travelling down the piping system thus is dissipated by some of the liquid being jetted through the apertured plate toward the cavity. The cavity is large compared to the quantity of liquid jetted through the apertured plate, so there is little change in its volume. The porosity of the apertured plate influences the percentage of energy absorbed.

13 Claims, 7 Drawing Figures cally and without the need for any structural manipulation, adjustment or replacement.

This invention provides a shock wave absorber to be located in series in a piping system line and thereby defining part of the normal liquid flow path, the absorber having a pressure confining housing larger than the normal flow path. An apertured plate is disposed between the flow path and a pressure cavity defined also in the housing, the plate extending a distance up to several diameters of the piping system line. Means adjustably pressurizes the cavity with a gas so as to maintain the liquid surface in the cavity with an overlying relatively large volume of the gas itself. Any pressure pulse in the absorber flow path, in the form specifically of a shock wave travelling through the piping system, forces coolant as small jets through the apertured plate, thereby attenuating the pressure intensity and also absorbing energy from the shock wave.

DETAILED DESCRIPTION OF THE INVENTION

Figure 1:
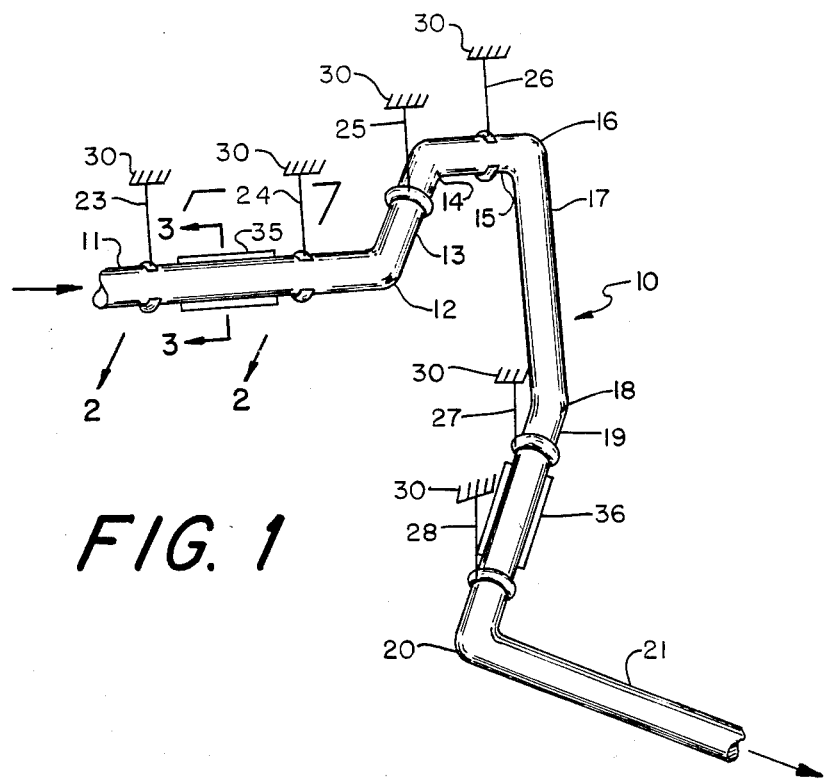
FIG. 1 is a perspective view of a typical three-dimensional piping system having at several locations therein a shock wave absorber of the type disclosed in the subject application.

FIG. 1 illustrates a typical three-dimensional piping system or network 10 that might be used in conveying a liquid, the piping system having a plurality of runs 11, 13, 15, 17, 19 and 21 separated by bends 12, 14, 16, 18 and 20 respectively. The illustrated three-dimensional network is symbolic only but it can be supposed that runs 11, 15, or 17 might extend parallel to the drawing sheet; runs 13 and 19 might extend normal to the drawing sheet whereby bend 12, 14 and 18 are formed over 90°; and run 21 might be angled both from the horizontal and vertical and be angled relative to the drawing sheet also. The network 10 is also presupposed to have liquid flow as indicated by the arrow, so each pipe run would have an upstream end and a downstream end. Each pipe run also is of circular cross section although this is not material to the invention. Hangers 23, 24, 25, 26, 27 and 28 are shown suspending the piping system 10 from indefinite structural anchors 30. The hangers must be capable of withstanding a seismic event, whereupon the piping network can be laterally loaded, and thus must be reinforced to provide for such strength and rigidity.

As illustrated, it can be envisioned further that if a pressure pulse enters at the upstream end of the run 11, it would be transmitted as a shock wave axially along the run 11 to slam into the bend 12, thereby exerting a lateral load on the adjacent hangers 24 and 25. At least part of the shock wave further would be transmitted axially through pipe run 13 to also slam against the bend 14, straining the hangers 25 and 26. These loads can induce movement of the piping system 10 relative to the fixed structural anchors 30, which could also build up in intensity should any harmonic frequencies of the hangers, etc., be encountered. In order to reduce such movement, elaborate snubbers (not shown) may be required to absorb the energy of impact. These snubbers can be quite expensive when they are sized to withstand the pressure shock waves, generated by a sodium-water interaction, or by a seismic event; but the former is generally of larger overall magnitude and is thus design limiting in a liquid metal cooled reactor.

This invention thus becomes important in minimizing the added costs for any piping system against the adverse effects of high energy pressure pulses. In the illustrated example, piping runs 11 and 19 are interrupted and a shock wave absorber device 35, 36 is positioned serially in each.

Figure 2:
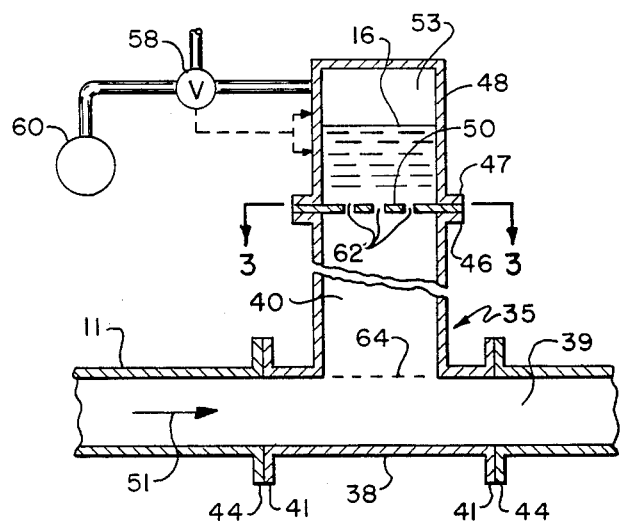
FIG. 2 is an enlarged sectional view as seen generally along a vertical plane from line 2—2 in FIG. 1 showing a first embodiment of the subject shock wave absorber.

Referring now to FIG. 2, one embodiment of a typical shock wave absorber 35-36 (identified in the singular as 35) is seen to include a T-shaped housing 38 defining a through flow section 39 and a stem or stub section 40 vertically offset therefrom and extended normal thereto. Flanges 41 are appropriately located at the ends of the housing flow through section 39 to allow connection respectively with complementary flanges 44 of the piping system itself. Flange 46 provided on the housing stub section 40 allows for the connection thereto by flanges 47 of housing 48; and a pressure transducer or apertured separator plate 50 is interposed between the flanges 46 and 47.

For sake of explanation, liquid flow in the piping system (at run 11, for example) is assumed to be in the direction indicated by the arrow 51, and the liquid would fill into the housing stub section 40 until the gas pressure in chamber 53 within the housing 48 balanced the pressure of the liquid in the piping system. In this regard, a level indicating control 54 would be used to keep the liquid surface 56 at some specific predetermined height above the apertured plate 50 and within the housing 48, while yet having a relatively large overlying volume of gas, by regulation of the gas pressure within the chamber 53. A neutral gas (such as nitrogen or argon) would be used, admitted into or discharged from the chamber 53 via valve control 58 from a pressurized gas source 60. The height of the liquid surface 56 above the apertured separator plate 50 would normally be set anywhere between approximately 0.5" minimum and 6" maximum, depending on the size of the entire unit, the pressure of the liquid contained in the piping system, and the anticipated pressure and character of the shock wave that might occur in the piping system.

Figure 3:
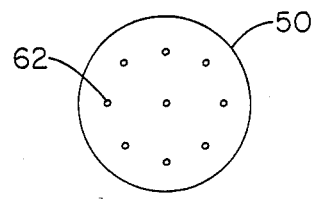
FIG. 3 is a plan view, as seen generally from line 3—3 in FIG. 2, of an apertured separator plate used in the illustrated shock wave absorber.
Figure 4:
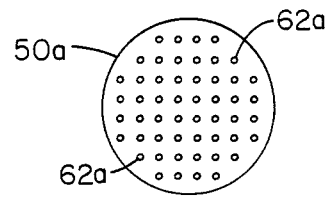
FIG. 4 is an alternate apertured separator plate that could be used in the shock wave absorber of FIG. 2.

Specifically referring to FIGS. 3 and 4, several potential hole arrays for the apertured plate are indicated; FIG. 3 for example, showing the plate 50 having only seven holes 62 disposed in a somewhat hexagonal configuration, and FIG. 4 showing alternate plate 50a having a much larger plurality of holes 62a disposed over a somewhat squared configuration. The openings near the plate periphery for receipt of bolts (not shown) to hold the flanges together and the plate therebetween are not illustrated for clarity of disclosure. Also, gaskets

SHOCK WAVE ABSORBER HAVING APERTURED PLATE

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

In many industrial applications, a liquid is conveyed through a piping system that can be extended over an elaborate three-dimensional network having bends, tees elbows, etc., held in place by braces or hangers. The possibility exists that a pressure pulse can be generated in the liquid, where the instantaneous liquid pressure might rapidly increase by a factor of 1.5–10 or even more at times. This pressure pulse is transmitted in the form of a shock wave through the liquid at sonic velocity (for example, 4,000–8,000 ft. per sec.) through the piping system.

The travelling pressure shock wave can damage equipment along the piping system and/or can damage the braces supporting the piping system. The effect this shock wave has on the piping system can also be amplified because of a resonant condition, occasioned, for example, when opposite ends of the same relatively straight section of piping are simultaneously exposed to a positive increase and a negative decrease in the wave pressure. Moreover, pressure intensities can be amplified where parallel flow paths reunite to combine the many waves in each path.

This particular phenomenon has critical consequences in liquid metal fast breeder reactor designs where molten sodium is used as a first coolant conveyed through a piping system; and where water is used as a second coolant that at a heat exchanger interfaces with the sodium. In the event a large leak should occur at this interface allowing contact between the sodium and water, a rather violent almost explosive-like reaction can occur which would generate a large pressure shock wave.

Because sodium is highly corrosive and is maintained at temperatures in the range of 400°–600° C., many conventional shock absorbing or energy-dissipating devices prove ineffective or are not usable. For example, a rupturable disc is frequently used in a T-connection off the sodium piping system to separate the system from a secondary or reaction products handling system. A reverse-buckling thin spherical shell is located in the T-connection with its convex side subjected to the fluid system, and a cutting-knife setup is placed immediately near the concave side of the disc. Upon the occurrence of a sufficiently intense pressure pulse in the sodium system, the disc is reverse flexed and ruptured, and the sodium can escape through the ruptured disc into the secondary system. This reduces the overall pressure of the sodium in the piping system, and also reduces the transmitted pulse, both in magnitude and duration. Even so, the transmitted pulse can cause significant damage to the piping system unless the system is strengthened and reinforced to take the increased loads.

One major drawback to any diversion of sodium from the piping system (by rupture disc actuation) is the reduced capacity for cooling the reactor. Moreover, the rupturable disc system cannot distinguish between a shock wave generated by a sodium-water reaction and one generated by a severe seismic event. Consequently, the disc must be sized to withstand seismic events of probable intensity, which thereby limits the sensitivity of the system. Another drawback is that the ruptured disc must be replaced and the sodium that has been diverted into the secondary system must be pumped back into the piping system.

Another commonly used shock absorber or pressure suppressing device is a surge tank connected by a tee off the main liquid line. The surge tank can be formed with a piston movable in a cylinder to expand and accept the diverted liquid, or the tank can have a pressurized gas overspace that is compressed in accepting the diverted liquid. Because of the reflection of the energy collected in the surge tank, the capacity to dissipate shock energy is limited as the energy basically is commonly returned back to the system after some delay. This system, however, can attenuate the intensity of the pressure, and moreover has appeal over the rupturable disc system in that it need not be replaced once it has been activated. Also, the accumulated liquid can be pumped or drained by gravity back into the main piping system after the pressure surge has been dissipated.

Another type of shock or energy absorber commonly used in some liquid piping systems is an expandable rubber membrane formed off a tee in the piping system, which retains the liquid at one volume when the liquid is under stabilized pressure conditions but which increases in volume upon a surge of pressure to dissipate or absorb some of the shock wave energy. However, the energy absorbed by the rubber membrane is also stored in the membrane so that once the pressure wave has passed, the energy is released back into the piping system. Of even greater importance, the rubber membrane cannot function at the temperature and pressure limits (400°–600° C. and 100–200 psi) of molten sodium, and thus would be impractical in the reactor cooling conditions.

This same deformable absorber concept is also employed in some applications as a sealed hollow collapsible rubber tube sized smaller than and located within the piping system. The sealed tube is thereby collapsed upon a pressure surge. However, this device, being internal, has limited capacity and impedes normal liquid flow through the piping system. Furthermore, as previously noted, rubber cannot be used in the high temperature and corrosive environments of molten sodium.

SUMMARY OF INVENTION

This invention relates to an absorber device for dissipating pressure pulses or shock waves generated in a piping system carrying liquid, the device being usable with liquids of a corrosive nature and at high temperatures and pressures.

A basic object of this invention is to provide a shock wave absorber for incorporating into a piping system carrying liquid normally at a generally uniform pressure but potentially subject to pressure pulses of possibly many times this, the shock wave absorber being effective to dissipate or absorb large percentages (of the order up to and even exceeding 50%) of the energy level of the pressure surge.

A specific object of this invention is to provide a pressure pulse shock wave absorber that is usable for repeated or sequential pressure shock waves automatior seal welds typically used at the interfaces of the flanges or plate are not shown.

The intended range of open area in the apertured plate 50 (or porosity as the same will be termed hereinafter) is of the order between 0.05 and 0.60 of the total area of the plate. The particular arrangement can vary; such as by having a large number of small openings (FIG. 4) or fewer openings each of relatively larger size (FIG. 3). In some applications, a single hole may be quite adequate. Within limits, the manner of how the porosity is obtained is not of too much importance to the basic invention. However the degree of porosity, as will be discussed later, can be adjusted to control reflections of the shock wave from the confinement in the pressure chamber 53 back through the plate, and thereby affect the performance of the device.

In the shock wave absorber illustration in FIG. 2, the apertured plate 50 is located at the terminal end of the transverse stub section 40, offset by possibly two or more diameters of the flow through section 39, from the walls of the piping system runs or the normal peripheral edge at line 64 of the liquid flow through the shock absorber device 35. This general configuration is termed hereinafter as a "stub" shock absorber device.

Figure 5:
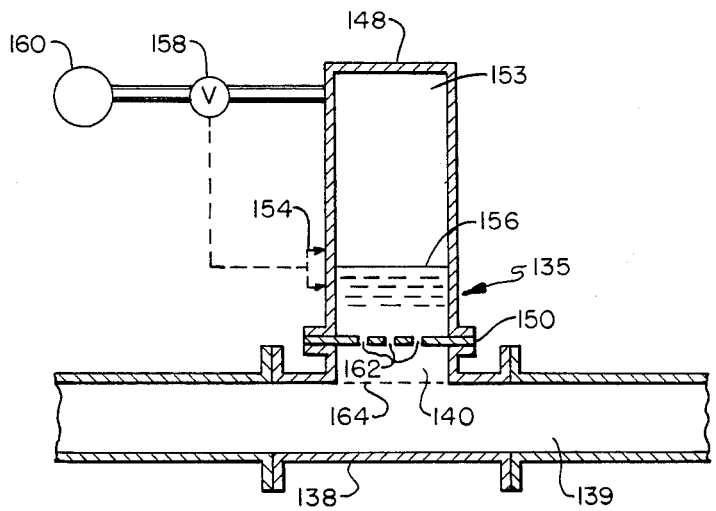
FIG. 5 is a sectional view, similar to FIG. 2, except showing an alternate embodiment of the shock wave absorber.

FIG. 5 on the other hand illustrates a shock wave absorber 135 in most respects identical to that illustrated in FIG. 2 except that the effective stem or stub section 140 of the housing 138 is quite small, even less than one diameter of the flow through section 139, without unduly disrupting the liquid flow in the through section. Accordingly, apertured plate 150 with its holes 162 is offset very little from the walls of the piping system runs or the normal peripheral flow line 164 of the main through housing 139 of the shock wave absorber 135.

The remaining components, including the level control 154, 158, 160 for maintaining the liquid surface 156 spaced above apertured separator plate 150 and within the housing 148 by adjusting the gas pressure in space 153 would in all respects be identical to the embodiment of FIG. 2. The stub sections 40 and 140 might typically be formed as tubular extensions disposed transverse to and the same size as the through flow section 39 and 139 respectively so that each opens to the through flow section along approximately one diameter of axial length; although it would be possible also to flatten out the stub sections to open to the through flow section along an axial length of possibly several diameters of axial length.

Figure 6:
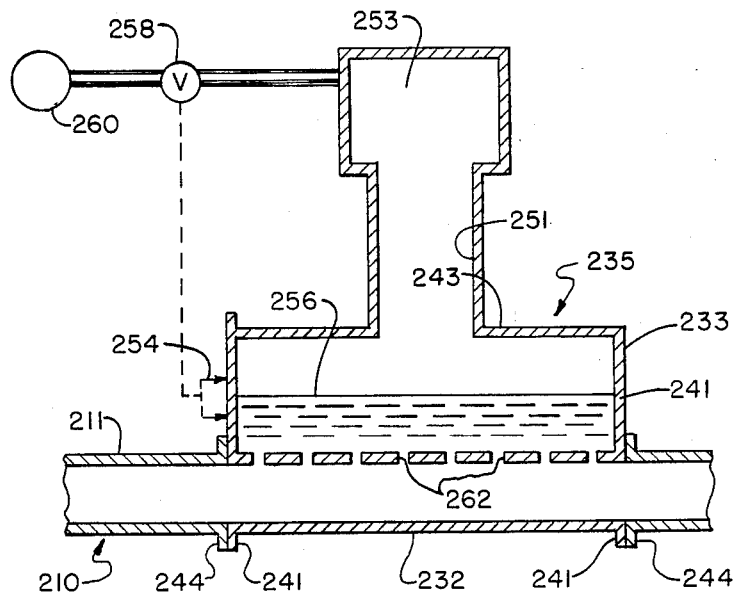
FIG. 6 is a sectional view, similar to FIG. 2, except showing yet another alternate embodiment again of the shock wave absorber.
Figure 7:
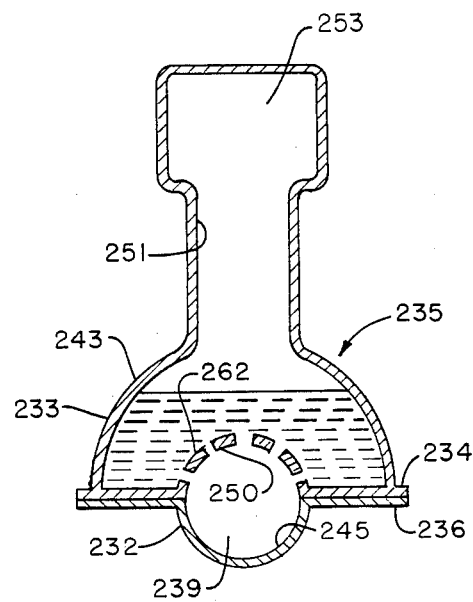
FIG. 7 is a cross sectional view as seen generally from line 7—7 in FIG. 6.

A further embodiment of a shock wave absorber 235 is illustrated in FIG. 6 and 7. In this embodiment, the absorber housing is bifurcated including a lower half section 232 and an upper half section 233 which are connected together at matched flanges 234 and 236. The housing 235 is connected also by flanges 241 and 244 into the run 211 of the piping system 210, while the adjacent walls 245 and 250 of the lower and upper half sections respectively, match up to define a main flow through section 239 that complements and is axially in line with the upstream and downstream sections of the piping system itself. Note that the upper section wall 250 has a plurality of openings 262 formed therein similar to the openings previously noted in the apertured plate 50. Further, the upper half section has imperforate outer walls 241 and 243 which define thereby a sealed chamber above the perforated wall 250 and open via conduit 251 to housing chamber 253. Thus, the upper half section 233 is gas tight and further the liquid surfaces 256 can be maintained therein above the apertured wall 250 by appropriate level sensing control 254, 258 and 260.

Under normal operating conditions, the liquid level or surface (56 in FIG. 2, 156 in FIG. 5 and 256 in FIG. 6) in the respective shock wave absorber device is at an elevation above or opposite the apertured plate (50, 150 and 250, respectively) from the normal liquid flow through section of the shock wave absorber device. The gas space or attenuation region (53, 153 and 253) maintained above the surface of the liquid likewise would be of sufficient volume, relative to any minor vertical fluctuations in the liquid level, that such fluctuations do not of themselves appreciably change the pressure in the gas space. The shock wave absorber device would normally be interposed, as noted, in a pipe run of a piping system where a shock wave might normally be generated in the piping system. This might occur, for example, in a nuclear reactor cooling system where sodium might under failure conditions interface with water, thereby generating a chemical reaction that would generate pressure shock waves travelling through the piping system at the sonic velocity.

One basic characteristic of the travelling shock wave is that it produces a rapid increase in pressure compared to the pressure of the liquid under normal flow conditions and before the occurrence of the shock wave. The high pressures of the shock wave at the apertured plate, induce a liquid transfer through the apertured plate in the form of high velocity jets. The jets dissipate a large percentage of the energy of the shock wave, in the conversion between pressure and kinetic energies and ultimately in the generation of heat, and without appreciably transferring a large quantity of the liquid itself. Thus, the pressure in the gas space is not appreciably increased because of the influx of the liquid jets. The jets beyond the apertured plate are dissipated initially in the liquid proximate the apertured plate and further may be atomized into the gas space overlying the liquid surface.

Specifically, the travelling wave is divided at the shock wave absorber device into an axial through flow portion and a lateral (vertical) portion. The pressure pulse diverted laterally is passed through the apertured plate and is either totally or at least partially absorbed behind the apertured plate. When the divided pulse is absorbed only partially, the remainder of the energy reflects back to the main flow section of the piping system. However, the returning pulse can negate the intensity of pressure in the primary shock wave if such sonic reflections are in opposite phase with the pressure pulse passing through the shock wave absorber device. In this regard, the offset of the apertured plate relative to the main flow of the piping system can be of some significance since a small offset assures prompt interaction by the reflective wave.

In this regard, large negative wave reflections can occur in conventional surge tanks or accumulators or the like, such that although the initial effect may be to reduce the pressure of the travelling wave, additional pressure pulses may be reintroduced into the piping system at a later time or at a different location in the system. The apertured plate devices disclosed herein not only reduce the peaks of such wave generations but also most typically reduce the overall energy in the wave.

In the stub tube type of shock wave absorber (FIG. 2) about half the shock wave energy passes through the main flow path and the remainder is diverted into the stub tube to the apertured plate. With the aperture plate porosity being in the low 3 to 5% range, nearly all of this diverted energy can be absorbed. With near total absorption, there will be no significant reflections (either positive or negative) to affect the rear portion of the primary pulse as it traverses through the device. If the porosity of the plate is too low, a positive reflection could occur to increase the pressure levels of the trailing portion of the primary pulse. If the porosity is too large, a negative reflection could occur to attenuate the trailing portion of the primary pulse and produce some negative pressure pulse waves in the piping system. Thus, the advantage of the absorber device of FIG. 2 is that with a low porosity nonreflective apertured plate the degree of energy absorption and pressure pulse attentuation is well defined, i.e., about half the energy will be absorbed and half transmitted. The overall effect is an approximate 33% reduction in the amplitude of the transmitted pulse.

In the reentrant type of shock wave absorber shown in FIG. 5, the offset between the through flow path and apertured plate is minimized to maximize the interaction of the reflected wave, and the porosity of the plate is increased such that the reflected negative wave will be just large enough to cancel out all or nearly all of the primary pulse traversing the device. This may require aperture plate porosities up to approximately 60% for the conditions encountered in liquid metal piping systems. The actual porosity selected depends on the size and duration of the primary pulses to be absorbed. The advantage of the reentrant high porosity FIG. 5 absorber device is that it can produce a nearly 100%, instead of only a 33% reduction in the transmitted pressure pulse. The main disadvantage is that the shock wave pulses of extended duration may require a larger gas space since the greater apertured plate porosity will pressurize the gas space much more rapidly than would be the case with a low porosity apertured plate more commonly used in the FIG. 2 stub tube absorber device.

The shock wave absorber in FIG. 6 has further increased the effectiveness in attenuating the energy, because of the increased area of the apertured plate axially along the through flow section of the piping system. Under such a structural configuration, the apertured plate may extend several and possibly even up to 10 or 15 diameters of the through flow section.

In a liquid metal cooled reactor application, the preferred range of plate porosity would be between perhaps 1% and 60%. The greater porosities tend to introduce negative reflections out of confinement of the sealed gas space and back through the apertured plate. This however may not be desirable depending on the strength and duration of the expected primary pulses. The disclosed shock wave absorbers are especially suited in piping systems where the operating pressures are relatively high where they can suppress or attenuate the wave pressures without producing undesirably large negative waves.

The porosity of the apertured plate needed to properly control the negative wave reflection depends on the pressure of the liquid normally, the intensity of the shock wave itself, the viscosity of the liquid and the speed of the shock wave. Normally, there will be some reflection at the apertured plate, since the shock wave itself will not be fixed in pressure intensity but will vary depending upon its cause as well as its distance axially along the piping system from the cause. When the apertured plate has a relatively high porosity (greater than 35% or the like) the percent of energy reflected as a negative pulse will be high, reducing the intensity of the pulse transmitted down the line. However this reflected negative wave can under some circumstances be undesirable since negative pulses can also cause excitation of the piping system.

Thus the portion of the shock wave impacting the apertured plate is subject to zero, positive, or negative reflection of energy depending on the porosity of the plate itself. In a zero reflection shock wave absorber, the portion of the pressure wave itself that is absorbed by the device approaches $\frac{1}{3}$ of the total amplitude of the wave. This means that the shock wave absorber is effective to allow only $\frac{2}{3}$ of the shock wave amplitude to pass through the device. If the reflection is positive, the latter portions of the transmitted pulses will be augmented by the reflective shock wave to create a minor pulsed surge or increase in such pressure. If the reflection is negative, the latter portions of the transmitted pulse will be reduced or negated by the reflective energy levels. In virtually all cases however, the lead edge of the travelling wave will have its pressure energy substantially reduced by the apertured plate shock wave absorber. Moreover, the duration of the reflective or precursor pulse can be reduced to zero or almost zero by reducing the offset distance to the orifice plate as is noted in the reentrant designs of FIGS. 5 and 6. Properly designed, shock wave absorber serves to spread out the duration and to reduce the peak pressure of any portion of the shock wave that is passed through the absorber. This mitigates the adverse effects of such shock waves.

By way of example in a shock wave absorber device used in a sodium line in a nuclear reactor cooling system, the diameters of each aperture or orifice might be between $\frac{1}{8}$ and $\frac{1}{2}$ of an inch, depending upon the overall size of the shock wave absorber device, and the pressure levels and viscosity of the liquid in question. The jets may produce coolant velocities of between 200 and 2000 ft./sec., depending on the differential intensity of the shock wave and its duration.

The embodiments of the invention in which an exclusive property or privilege is claimed are defined as follows:

1. In a piping system having a line carrying a liquid, a shock wave absorber in the line comprising, a housing interposed in series in the piping system line and sized generally larger than the line, an inner wall disposed generally horizontally in the housing and dividing the housing into a through flow section for the liquid and a vertically overlying laterally offset attenuation region, said inner wall having a plurality of apertures therein, means for pressurizing and automatically controlling the pressure of a gas in said attenuation region in response to the level of liquid in said housing so that the liquid enters said region through the apertures and covers said inner wall while leaving an overlying volume of the gas, whereupon a significant pressure pulse transmitted to the through flow section will cause liquid movement through the apertures in the attenuation region as high velocity jets of small overall volume compared to the volume of gas, thereby effectively attenuating the pressure pulse and its transmission through and beyond the shock wave absorber.

2. In a piping system having a line carrying a liquid, a shock wave absorber in the line comprising, a housing sized slightly larger than a line of the piping system and positioned in series in the line and confining the pressure of the liquid therein, an inner wall located internally of the housing and dividing the housing into a liquid flow through region and an overlying attenuation region, the inner wall having a plurality of apertures therein so as to allow liquid migration therethrough, means for pressuring and automatically controlling the pressure of a gas in the overlying attenuation region in response to the level of liquid in said housing so as to maintain the liquid level over the apertures at all times, the apertures defining an inner wall porosity of the order between 0.01 and 0.60 and each aperture being of generally small size, so that a significant pressure pulse transmitted axially along the piping system to the through flow region will cause liquid movement in the attenuation region through the apertures in the form of jets having high velocity effective thereby to dissipate the pressure pulse and minimize pulse transmission through and beyond the absorber.

3. A shock wave absorber as defined in claim 2, wherein the inner wall is laterally in line with the structure of the piping system defining the line.

4. A shock wave absorber as defined in claim 2, wherein the inner wall is laterally offset from the structure of the piping system line in the direction away from the center of the line.

5. A shock wave absorber as defined in claim 4, wherein the apertures define an inner wall porosity of the order between 0.20 and 0.40.

6. A shock wave absorber as defined in claim 4, wherein the lateral offset of the inner wall is generally small of the order of less than one diameter of the piping system line.

7. A shock wave absorber as defined in claim 6, wherein the apertures define an inner wall porosity of the order between 0.20 and 0.40.

8. A shock wave absorber as defined in claim 4, wherein the lateral offset of the inner wall is quite large of the order of more than several diameters of the piping system line.

9. A shock wave absorber as defined in claim 8, wherein the apertures define an inner wall porosity of the order between 0.20 and 0.40.

10. A shock wave absorber as defined in claim 2, wherein the attenuation region is in part formed as a cylindrical tube disposed traverse to and approximately the same size as the piping system line.

11. A shock wave absorber as defined in claim 2, wherein the attenuation region is in part formed as a cylindrical tube disposed axially in line with and approximately the same size as the piping system line.

12. The apparatus as defined in claim 1 wherein said means for controlling pressure comprises a level control for keeping the liquid at a preselected level.

13. The apparatus as defined in claim 1 wherein said attenuation region has an unobstructed volume of the liquid disposed between the apertures and the through flow region wherein liquid flow is substantially perpendicular to the liquid flow through the apertures.

* * * * *